United States Patent [19]
Studer

[11] 3,865,442
[45] Feb. 11, 1975

[54] MAGNETIC BEARING
[75] Inventor: Philip A. Studer, Silver Spring, Md.
[73] Assignee: The United States of America as represented by the Administrator of the National Aeronautics and Space Administration, Washington, D.C.
[22] Filed: Dec. 22, 1970
[21] Appl. No.: 100,637

[52] U.S. Cl. .................................................. 308/10
[51] Int. Cl. .............................................. F16c 39/06
[58] Field of Search.......... 308/10; 74/5.6; 73/517 B

[56] References Cited
UNITED STATES PATENTS

| | | |
|---|---|---|
| 2,733,857 | 2/1956 | Beams................................... 308/10 |
| 3,356,425 | 12/1967 | Carriere............................... 308/10 |
| 3,365,248 | 1/1968 | Zedekar................................ 308/10 |
| 3,493,275 | 2/1970 | Stone.................................... 308/10 |
| 3,565,495 | 2/1971 | Lyman.................................. 308/10 |

Primary Examiner—R. Skudy
Attorney, Agent, or Firm—R. K. Kempf; John R. Manning

[57] ABSTRACT

A magnetic bearing includes a pair of coaxial, toroidal, permanent magnets having axially directed poles. Like poles of the permanent magnets are adjacent each other, whereby the permanent magnets have a tendency to be urged apart along the common axis thereof. An electromagnet is wound coaxially with the permanent magnets in such a manner that the poles thereof are axially directed. Between the poles of each permanent magnet there is a low magnetic reluctance circuit including two series air gaps. Between the poles of the electromagnet a low reluctance path including only one air gap of each of the low magnetic reluctance circuits is provided. The low reluctance path for the electromagnet includes a ring axially translatable relative to the permanent magnets. The ring forms opposite faces of the air gaps in the magnetic circuits for each permanent magnet.

24 Claims, 4 Drawing Figures

PATENTED FEB 1 1 1975  3,865,442
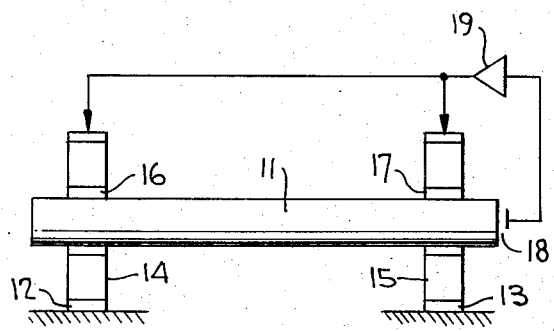
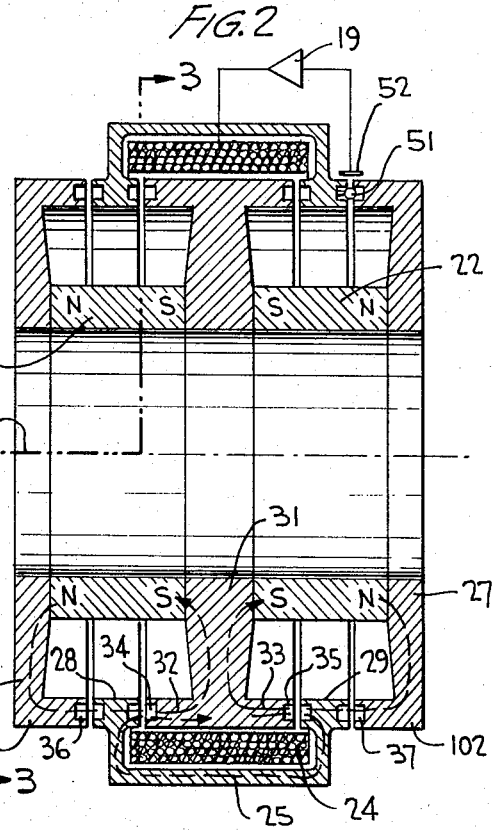
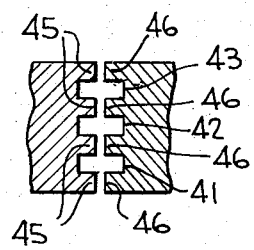
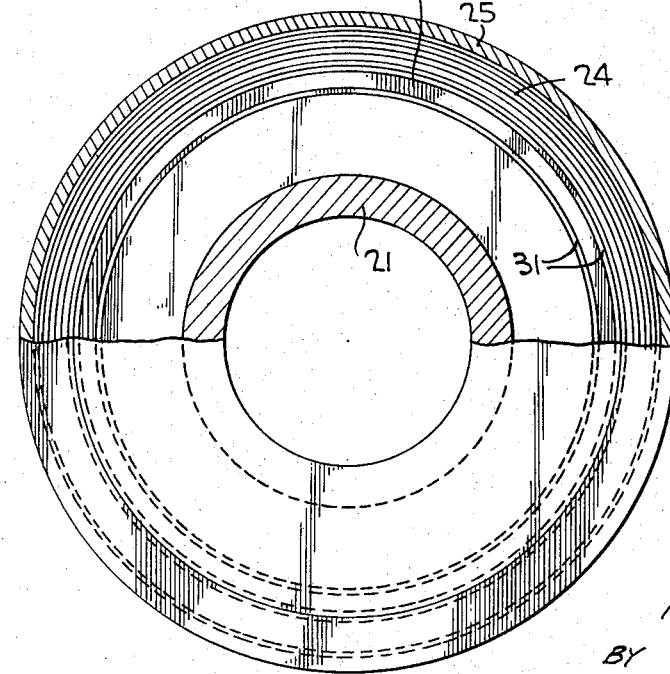
INVENTOR,
PHILIP A. STUDER
BY NEIL F. SIEGEL
ATTORNEYS 3,865,442

MAGNETIC BEARING

ORIGIN OF THE INVENTION

The invention described herein was made by an employee of the United States Government and may be manufactured and used by or for the Government for governmental purposes without the payment of any royalties thereon or therefor.

FIELD OF INVENTION

The present invention relates generally to magnetic bearings and, more particularly, to a magnetic bearing wherein magnetic fields derived from diverse sources are coupled to the same air gaps via different, low magnetic reluctance paths.

BACKGROUND OF INVENTION

Magnetic bearings for axially supporting a magnetic body generally include a first or primary set of electromagnets disposed on opposite sides of the body to be supported. The primary electromagnets provide the primary force tending to hold the body in situ. Typically, the primary electromagnets are supported and exert attractive forces on opposite sides of the body so that there is a tendency for the body to be held in equilibrium. To establish stability for the position of the body, it is generally necessary to monitor the position thereof relative to the electromagnets. In response to an output of the position monitoring device, a signal is applied to a second or secondary set of electromagnets which, in effect, applies a vernier force to the primary forces established by the primary electromagnet.

While electromagnets generally function satisfactorily in environments wherein power is readily available, they are not desirably utilized in systems where power must be minimized, such as exists in spacecraft applications. The primary electromagnets continuously consume appreciable amounts of power. To support a relatively large load, on the order of 20 pounds in outer space, an electromagnet must be continuously supplied with a current on the order of one to two amperes from a d.c. power supply having a potential on the order of 10 volts. The continuous drain of 10 to 20 watts in outer space and some other applications cannot be tolerated.

It might appear that the obvious solution to the problem of power consumption by a primary electromagnet of a magnetic bearing is to substitute a permanent magnet for a primary electromagnet in an existing bearing arrangement. This substitution is not feasible, however, because a permanent magnet has an extremely high magnetic reluctance. Since the permanent magnet in such a configuration would be in a magnetic series circuit with the vernier flux derived from the secondary electromagnet, the force of the secondary electromagnet on the body being supported would not be adequate to stabilize the body satisfactorily.

According to the present invention, there is provided a magnetic bearing wherein a primary magnet means supplies oppositely directed magnetic fluxes to a pair of air gaps. A secondary magnet means supplies magnetic flux in a single direction to the air gaps. The magnetic circuits and paths of the primary and secondary magnets are such that the magnetic flux derived from the secondary magnet means does not traverse the pole faces of the first magnetic means. Thereby, there is no high magnetic reluctance in series with the path for the secondary magnet and the first magnetic means can be a permanent magnet assembly.

The primary magnet means, i.e., the permanent magnet assembly, is preferably translatable relative to a stationary low magnetic reluctance member in the magnetic path for the secondary magnet means. The low reluctance member includes oppositely directed faces of the air gaps through which the oppositely directed fluxes from the permanent magnet assembly flow. To enable the total flux from the permanent magnet to be maintained constant, a result achieved by establishing a constant reluctance between the permanent magnet pole faces, a second pair of air gaps is provided. The second pair of air gaps is positioned relative to the permanent magnets so that flux from the permanent magnet assembly flows through them in opposite directions. The second pair of air gaps is outside of the low reluctance path for the secondary, electromagnets.

A further feature of the invention is that the secondary magnet, which is the only electromagnet included in the bearing, can be fixedly secured to the stationary member. Thereby, the need for slip rings, or the like, to supply current to electromagnets is obviated.

It is, accordingly, an object of the present invention to provide a new and improved magnetic bearing.

Another object of the invention is to provide a new and improved magnetic bearing having lower power requirements than prior art magnetic bearings.

A further object of the present invention is to provide a magnetic bearing wherein the primary magnetic force is derived from permanent magnet means.

Another object of the invention is to provide a new and improved magnetic bearing wherein the magnetic flux derived from a primary magnet source is maintained constant because reluctance of the circuit for the magnet is maintained constant.

yet another object of the invention is to provide a new and improved magnetic bearing wherein current is supplied to only stationary members, so that no slip rings are required.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWING

FIG. 1 is a schematic view illustrating a system employing the concepts of the present invention;

FIG. 2 is a cross-sectional view of a preferred embodiment of the magnetic bearings included in the system of FIG. 1;

FIG. 3 is a sectional view taken through the lines 3—3, FIG. 2; and

FIG. 4 is a segment of a modified form of the magnetic bearing illustrated in FIGS. 2 and 3.

DETAILED DESCRIPTION OF THE DRAWING

Reference is now made to FIG. 1 of the drawings wherein there is schematically illustrated a system including the magnetic bearing of the present invention, in combination with a means for controlling the axial position of shaft 11. Shaft 11, which can be fabricated of magnetic or nonmagnetic materials, is magnetically suspended about similar stationary supports 12 and 13 located in proximity to opposite ends of the shaft. Stationary support 12 and 13 are magnetically coupled to and form a part of like magnetic suspension assemblies 14 and 15, respectively. There is, however, no physical interconnection between magnetic assemblies 14 and 15 and stationary supports 12 and 13. The interior segments of magnetic assemblies 14 and 15 are fixedly connected by suitable means 16 and 17 to the periphery of shaft 11. If shaft 11 is fabricated of a material having a low magnetic reluctance, such as iron, connecting means 16 and 17 have a substantial radial thickness and are fabricated from nonmagnetic material, such as plastic, thereby to provide a high reluctance path between magnetic assemblies 14 and 15 and shaft 11. If shaft 11 is fabricated from a nonmagnetic material it is bonded directly to the interior peripheral surfaces of magnetic assemblies 14 and 15, in which case connecting means 16 and 17 can be in the form of epoxy cement layers.

The axial position of shaft 11 relative to stationary supports 12 and 13 is determined by a suitable position sensor 18. Position sensor 18 may take the form of a capacitive, magnetic, optical or other sensor; one particularly advantageous optical sensor is described infra. The signal derived from position sensor 18 is fed to the input of amplifier 19, the output of which drives coils fixedly mounted in staitonary supports 12 and 13. The coils in stationary supports 12 and 13 are magnetically coupled to assemblies 14 and 15 to control the axial position of the assemblies and shaft 11 relative to the stationary supports. D.C. current is applied to the coils included in stationary supports 12 and 13 in parallel so that the coils included in the supports have a tendency to translate shaft 11 in the same direction. A pair of stationary supports is provided at either end of shaft 11 to prevent any twisting of the shaft relative to one of the ends. If only a single magnetic bearing were provided, there would be a tendency for twisting of shaft 11 about the interaction region between the magnetic assembly and the stationary support.

Reference is now made to FIGS. 2 and 3 of the drawings wherein there are illustrated sectional views of a preferred embodiment for a magnetic bearing assembly at one end of shaft 11, e.g., at the left end of FIG. 1. In FIGS. 2 and 3, there is no showing of shaft 11, nor is there a showing of the connecting means 16; the interior region of the bearing is shown as being filled only with air to simplify the drawing and because the shaft has no effect on the magnetic circuits of the bearing.

The magnetic assembly 14 includes a pair of toroidal, coaxial permanent magnets 21 and 22 having axially directed permanent magnet poles indicated by N and S. The surfaces of permanent magnets 21 and 22 adjacent each other and central to magnetic assembly 14 have a like polarity so that the permanent magnets have a tendency to repel each other along their common axis 23.

Coaxial with permanent magnets 21 and 22 is a toroidal electromagnet 24 that is preferably fixedly mounted on the inner wall of stationary, low magnetic reluctance ring 25, which is also coaxial with toroidal permanent magnets 21 and 22 and forms stationary support 12, FIG. 1. Coil 24 is wound so that the magnetic poles thereof are axially directed, whereby magnetic flux from the coil is axially directed respectively to aid and buck the magnetic fluxes derived from permanent magnets 21 and 22.

A relatively low magnetic reluctance path is provided between the pole faces of magnets 21 and 22 by annular end jackets 26 and 27, respectively. End jackets 26 and 27 are fabricated from a material having a low magnetic reluctance, such as soft iron. Jackets 26 and 27 extend radially to the inner periphery of toroidal permanent magnets 21 and 22 and outwardly from permanent magnets 21 and 22 by a sufficient distance to prevent short circuiting of the fluxes of the permanent magnets. Jackets 26 and 27 include axially extending arms 101 and 102 that are aligned with the innermost portions 28 and 29 of ring 25 to form a pair of low magnetic reluctance circuits for permanent magnets 21 and 22. The low reluctance circuits are completed by centrally located ring 31, that is fabricated of a material having a low magnetic reluctance. Ring 31 extends axially between opposite axial faces of interior segments 28 and 29 of ring 25 and radially to the interior periphery of permanent magnet toroids 21 and 22. Ring 31 includes peripheral arms 32 and 33 that are in radial alignment with the interior segments 28 and 29 of ring 25, as well as with the axially extending arms 101 and 102 of end jackets 26 and 27.

Between central ring 31 and the inner faces of interior portions 28 and 29 of ring 25 air gaps 34 and 35 are formed so that ring 31 floats relative to stationary ring 25 and is held in situ only by magnetic forces. In the assumed configuration, flux flows through air gap 34, from the left to right in FIG. 2, from the north pole of permanent magnet 21 to the south pole of the permanent magnet and is aided by flux flowing in the same direction derived from electromagnet 24. In contrast, flux from permanent magnet 22 is directed from right to left through air gap 35 and is bucked by the left to right flowing flux generated by electromagnet 24.

A further set of air gaps 36 and 37 is provided. Air gap 36 is located between the outside face of interior segment 28 of ring 25 and arm 101 of end jacket 26, while air gap 37 is formed between the outside face of interior portion 29 of ring 25 and arm 102 of end jacket 27, whereby the end jackets float relative to stationary ring 25 and are held in situ only by magnetic forces. Flux from permanent magnet 21 flows through gap 36 in the same direction as the permanent magnet flux flows through air gap 34, i.e., from left to right as illustrated in FIG. 2. Permanent magnet flux in air gap 37 flows in the same direction as the permanent magnet flux flow through air gap 35, from right to left. There is no substantial flux flow from electromagnet 24 in either of air gaps 36 or 37 as the electromagnet flux flows through the low reluctance path including series air gaps 34 and 35 and arms 32 and 33.

The magnetic flux produced by permanent magnets 21 and 22 functions as a primary magnet for floating end jackets 26 and 27, as well as central ring 31 relative to stationary ring 25. Because of the inherent instability of a magnetic bearing or suspension system, a correction current is always supplied to coil 24 by amplifier 19. The current supplied to coil 24 produces a magnetic flux in air gaps 34 and 35 to selectively aid or buck the permanent magnet fluxes in these air gaps. Thereby, the axial position of centrally located ring 31 has a tendency to shift axially relative to stationary ring 25. As ring 31 shifts relative to ring 25, the magnetic reluctance of air gaps 34 and 35 is changed. To enable the total magnetic reluctance of the permanent magnet circuit to be maintained constant, air gaps 36 and 37 cause differential movement of end jackets 26 and 27.

In analyzing the magnetic flux paths for the permanent and electromagnets, it is noted that the electromagnet flux path includes only ring 25 and the arms 32 and 33 of central ring 31. The high magnetic reluctance through permanent magnets 21 and 22 is thus excluded from the flux path for the electromagnet, whereby the amount of power that need be supplied to the electromagnet to attain stability is relatively low.

To provide additional stiffness to the system, the number of air gaps can be increased. The number of air gaps can be increased by adding additional air gaps in series with gaps 34–37, in which case additional floating ring-like assemblies must be provided between end jackets 21 and 22 and ring 25. This has the disadvantage of making it more difficult to initially assemble the magnetic bearing.

A preferred technique for including additional air gaps to increase stiffness is illustrated in FIG. 4 wherein the number of flux-carrying teeth is increased by providing several parallel flux paths formed by teeth 45 and 46. Additional parallel paths increase the total flux and the force between the elements, such as rings 25 and 31, in the magnetic circuits.

A convenient means for providing an indication of the relative axial position of one of the end jackets relative to stationary ring 25 is to monitor the separation between end jacket 27 and ring 25. The separation between end jacket 27 and stationary ring 25 is determined in a facile manner by monitoring the length of air gap 37 between the end jacket and stationary ring.

To this end, there is positioned a light source 51 in air gap 37. Positioned to be responsive to light propagated from light source 51, and mounted exteriorly of inner segment 29 and the axially directed arm 102 of end jacket 27, above the air gap, is photodetector 52. As the air gap 37 opens and closes, the amount of light transmitted from light source 51 to photodetector 52 is varied in amplitude. The variable amplitude signal derived from photodetector 52 is coupled to amplifier 19 to control the amplitude and direction of d.c. current in winding 24 of each of the magnetic bearing assemblies. The current fed to electromagnet 24 acts as a vernier control for the primary force derived by magnetic fluxes generated by permanent magnets 21 and 22. Since the primary magnetic force is generated by the permanent magnets, there is no continuous high drain power requirement but only the relatively low current applied to electromagnet 24 that functions as a secondary source of magnetic force.

While there has been described and illustrated one specific embodiment of the invention, it will be clear that variations in the details of the embodiment specifically illustrated and described may be made without departing from the true spirit and scope of the invention as defined in the appended claims. For example, electromagnet 24 could be fixedly mounted on arms 32 and 33, rather than on ring 25; such a configuration allows the jacket 26 to be the rotating element, with the permanent magnet assembly and electromagnet coil being stationary.

I claim:

1. A magnetic bearing comprising a low reluctance magnetic circuit having first and second air gaps in a magnetic series path, first magnet means coupled to said circuit for producing oppositely directed magnetic fluxes in the air gaps, and second magnet means coupled to said circuit via a low reluctance path excluding the first magnet means for producing similarly directed magnetic fluxes in the air gaps.

2. A magnetic bearing comprising a low reluctance magnetic circuit have first and second air gaps in a magnetic series path, first magnet means coupled to said circuit for producing oppositely directed magnetic fluxes in the air gaps, second magnet means coupled to said circuit via a low reluctance path excluding the first magnet means for producing similarly directed magnetic fluxes in the air gaps, third and fourth air gaps in a magnetic series path with said first magnet means and said first and second air gaps, said third and fourth air gaps being positioned outside of said low reluctance path and within the low reluctance circuit, and means for maintaining the total magnetic flux in said first, second, third and fourth air gaps substantially constant.

3. The bearing of claim 2 further including a fixedly mounted member of low magnetic reluctance, said member forming faces for all of said air gaps, said first magnet means being held in situ by the forces exerted thereby on the fixedly mounted member.

4. The bearing of claim 3 wherein the second magnet means includes a coil fixedly mounted on the member.

5. The bearing of claim 3 wherein the second magnet means includes a coil, means for sensing the position of the first magnet means relative to the member, and means responsive to the sensing means for controlling the amplitude of d.c. current applied to the coil to stabilize the relative position between the member and first magnet means.

6. The bearing of claim 5 wherein the means for sensing includes a light source in one of said air gaps, and a photodetector responsive to the amplitude of the light from the source passed through the air gap, the amplitude of the light varying in response to movement of the first magnet means relative to the member.

7. The bearing of claim 1 further including a fixedly mounted member of low magnetic reluctance, said member forming faces for both of said air gaps, said first magnet means being held in situ by the forces exerted thereby on the fixedly mounted member.

8. A magnetic bearing comprising a low reluctance magnetic circuit having first and second air gaps in a magnetic series path; a fixedly mounted member of low magnetic reluctance, said member forming faces for both of said air gaps; first magnet means coupled to said circuit for producing oppositely directed fluxes in the air gaps, said first magnet means being held in situ by the forces exerted thereby on the fixedly mounted member; and second magnet means coupled to said circuit via a low reluctance path excluding the first magnet means for producing similarly directed magnetic fluxes in the air gaps, said second magnet means including a coil, means for sensing the position of the first magnet means relative to the member, and means responsive to the sensing means for controlling the amplitude of d.c. current applied to the coil to stabilize the relative position between the member and first magnet means.

9. A magnetic bearing comprising a pair of coaxial toroidal permanent magnets having axially directed poles, similar poles of the permanent magnets being proximate each other so that the permanent magnets have a tendency to be urged apart, an electromagnet having a coil wound about the axis of the permanent magnets so that poles of the electromagnet are axially directed, a pair of low magnetic reluctance circuits, a different one of said circuits being provided between unlike poles of each of said permanent magnets, a pair of air gaps in a magnetic series path in each of said circuits, and a low reluctance path between unlike poles of the electromagnet, said low reluctance path including a portion of each of said circuits, said portion of each of said circuits including only one of said air gaps.

10. The bearing of claim 9 wherein said low reluctance path comprises a fixedly mounted ring coaxial with the permanent magnets, said ring being of low magnetic reluctance, said circuits including first and second low magnetic reluctance pole pieces carrying said permanent magnets, said permanent magnets and pole pieces being held in situ by magnetic forces applied thereby to the ring, said ring forming opposite faces of said air gaps.

11. The bearing of claim 10 wherein the coil is fixedly mounted on the ring.

12. The bearing of claim 11 further including means for sensing the axial position of the pole pieces relative to the ring, and means responsive to the sensing means for controlling the amplitude of d.c. current applied to the coil to stabilize the relative axial position between the ring and pole pieces.

13. The bearing of claim 12 wherein the means for sensing includes a light source in one of said air gaps, and a photodetector responsive to the amplitude of the light from the source passed through the air gap, the amplitude of the light varying in response to axial movement of the pole pieces relative to the ring.

14. The bearing of claim 9 further including means for sensing the axial position of the pole pieces relative to the ring, and means responsive to the sensing means for controlling the amplitude of d.c. current applied to the coil to stabilize the relative axial position between the ring and pole pieces.

15. The bearing of claim 14 wherein the means for sensing includes a light source in one of said air gaps, and a photodetector responsive to the amplitude of the light from the source passed through the air gap, the amplitude of the light varying in response to axial movement of the pole pieces relative to the ring.

16. A magnetic bearing comprising a pair of permanent magnets having a common axis, said permanent magnets having poles directed along the axis, adjacent poles of the permanent magnets being similarly polarized so that the permanent magnets have a tendency to be urged apart, an electromagnet having a coil wound about the axis of the permanent magnets so that poles of the electromagnet are axially directed, a pair of low magnetic reluctance circuits, a different one of said circuits being provided between unlike poles of each of said permanent magnets, a pair of air gaps in a magnetic series path in each of said circuits, a low reluctance path between unlike poles of the electromagnet, said low reluctance path including a portion of each of said circuits, said portion of each of said circuits including only one of said air gaps.

17. The bearing of claim 16 wherein said portion of said circuits and said low reluctance path comprises a fixedly positioned low magnetic reluctance member, said circuits including first and second low magnetic reluctance pole pieces carrying said permanent magnets, said permanent magnets and pole pieces being held in situ by magnetic forces applied thereby to the member, said member forming opposite faces of said air gaps.

18. The bearing of claim 17 wherein the coil is fixedly mounted on the member.

19. The bearing of claim 17 further including means for sensing the position of the pole pieces relative to the member, and means responsive to the sensing means for controlling the amplitude of d.c. current applied to the coil to stabilize the relative position between the member and pole pieces.

20. The bearing of claim 19 wherein the means for sensing includes a light source in one of said air gaps, and a photodetector responsive to the amplitude of the light from the source passed through the air gap, the amplitude of the light varying in response to movement of the pole pieces relative to the member.

21. The bearing of claim 1 wherein one of said magnet means includes a permanent magnet.

22. The bearing of claim 1 wherein said first magnet means includes a permanent magnet.

23. The bearing of claim 2 wherein one of said magnet means includes a permanent magnet.

24. The bearing of claim 2 wherein said first magnet means includes a permanent magnet.

* * * * *